United States Patent
Qin

(10) Patent No.: US 10,334,178 B2
(45) Date of Patent: Jun. 25, 2019

(54) FLASH LAMP, ELECTRONIC DEVICE HAVING THE FLASH LAMP AND METHOD FOR CONTROLLING THE FLASH LAMP

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Kan Qin, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 51 days.

(21) Appl. No.: 15/628,546

(22) Filed: Jun. 20, 2017

(65) Prior Publication Data

US 2017/0366728 A1    Dec. 21, 2017

(30) Foreign Application Priority Data

Jun. 21, 2016  (CN) .......................... 2016 1 0448285

(51) Int. Cl.

| H04N 5/235 | (2006.01) |
| H04N 5/232 | (2006.01) |
| H04N 5/225 | (2006.01) |
| G06K 9/20 | (2006.01) |
| G06K 9/00 | (2006.01) |
| G06K 9/32 | (2006.01) |
| G03B 15/05 | (2006.01) |
| G06T 7/20 | (2017.01) |

(52) U.S. Cl.
CPC .......... *H04N 5/2354* (2013.01); *G03B 15/05* (2013.01); *G06K 9/00771* (2013.01); *G06K 9/2027* (2013.01); *G06T 7/20* (2013.01); *H04N 5/2256* (2013.01); *H04N 5/2351* (2013.01); *H04N 5/23245* (2013.01); *G03B 2215/0521* (2013.01); *G06K 9/3233* (2013.01)

(58) Field of Classification Search
None
See application file for complete search history.

(56) References Cited

U.S. PATENT DOCUMENTS 8,767,976 B2 *  7/2014  Ohtsuka ............... H04N 5/2252
                                                       361/679.23

* cited by examiner

*Primary Examiner* — Mark T Monk
(74) *Attorney, Agent, or Firm* — ScienBiziP, P.C.

(57) ABSTRACT

A method for controlling a flash lamp of a camera to provide supplemental light during image-capturing is disclosed. The flash lamp includes a lamp and a position adjusting unit, the lamp being able to track a moving target object in addition to being able to apply spotlighting or wide angle illumination of the object. The method acquires a first brightness value surrounding a target object from a photosensitive unit, compares the value with a preset value and turns on the lamp when the value is less than the preset value. The camera can detect whether the target object is moving; and the lamp can be controlled to move (by the position adjusting unit) to track the moving target object and maintain illumination of it for the image-capture.

19 Claims, 5 Drawing Sheets

FLASH LAMP, ELECTRONIC DEVICE HAVING THE FLASH LAMP AND METHOD FOR CONTROLLING THE FLASH LAMP

CROSS-REFERENCE TO RELATED APPLICATIONS

This application claims priority to Chinese Patent Application No. 201610448285.4 filed on Jun. 21, 2016, the contents of which are incorporated by reference herein.

FIELD

The subject matter herein generally relates to artificial lighting, especially relates to a flash lamp, an electronic device having the flash lamp, and a method for controlling the flash lamp.

BACKGROUND

Traditional electronic device having a camera needs to turn on the flash lamp when the electronic device takes photographs in dark environment. However, when the object moves, light supplementing effect of the object is influenced because the flash lamp cannot track the object automatically.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
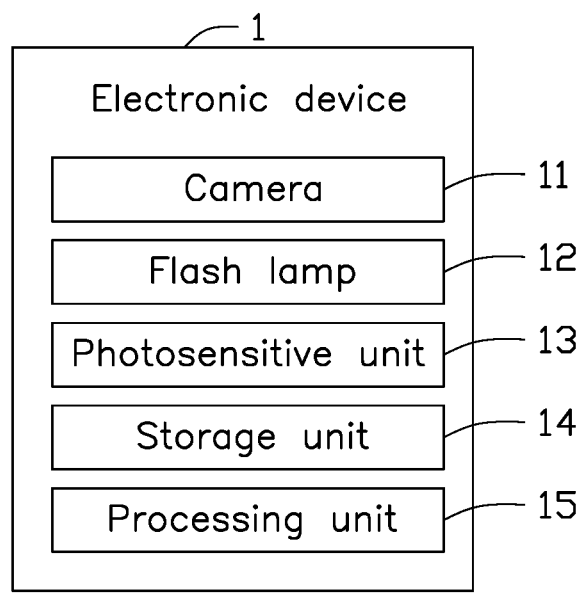
FIG. 1 is a block diagram of an embodiment of an electronic device having a flash lamp of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" indicates "including, but not necessarily limited to"; it specifically indicates open-ended inclusion or membership in a so-described combination, group, series, and the like.

Figure 2:
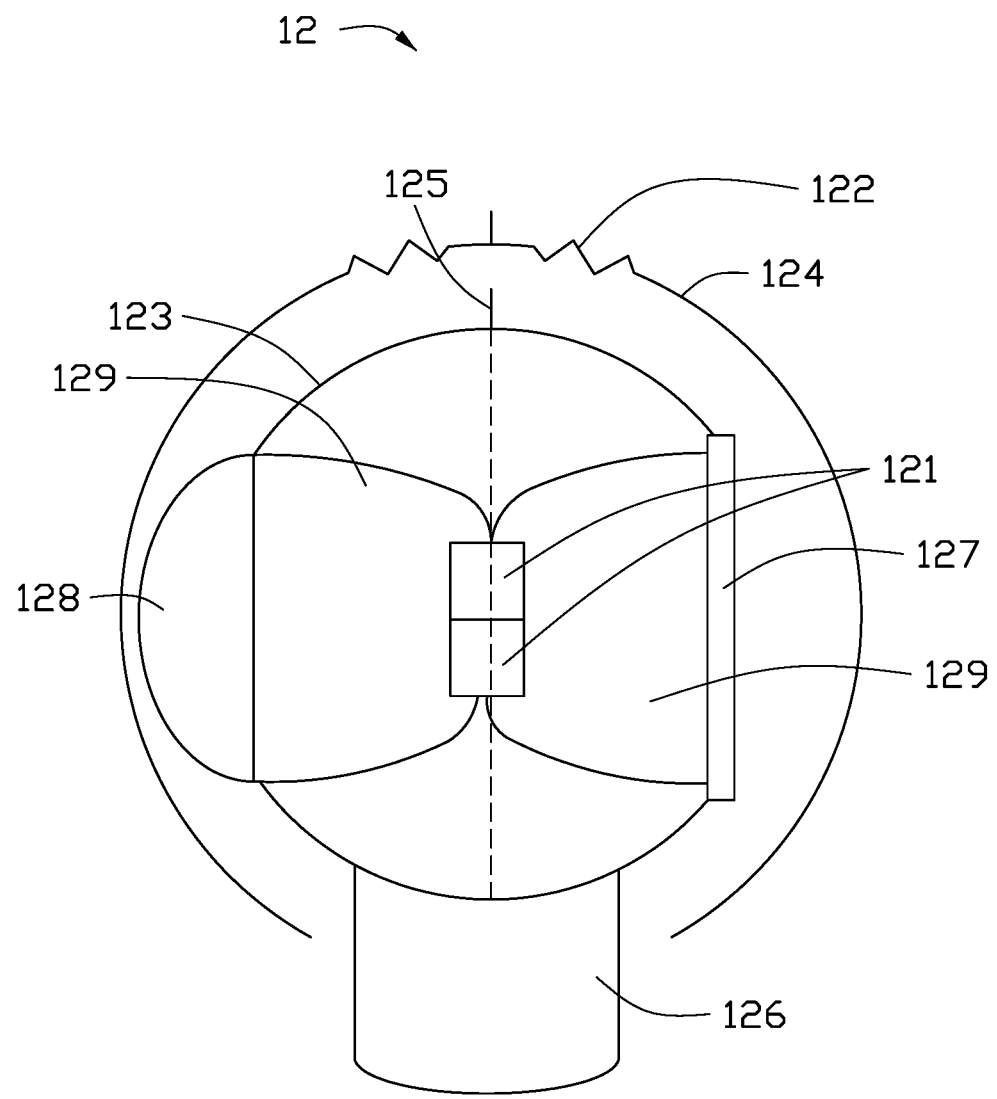
FIG. 2 is a schematic diagram of flash lamp assembly of FIG. 1.

FIG. 1 illustrates a block diagram of an embodiment of an electronic device having a flash lamp. In at least one exemplary embodiment, the electronic device 1 can be a smart phone, a tablet computer, or other suitable device. The electronic device 1 includes, but is not limited to, a camera 11, a flash lamp 12, a photosensitive unit 13, a storage unit 14, and a processing unit 15. The camera 11 is used to shoot an image of a target object. FIG. 2 illustrates the flash lamp 12. In at least one exemplary embodiment, the electronic device 1 includes, but is not limited to, at least one lamp 121, a position adjusting unit 122, an inner frame 123, an outer frame 124, and a rotating shaft 125. The lamp 121 provides supplemental light for the target object when the camera 11 shoots image of the target object. The outer frame 124 is set on the electronic device 1. The inner frame 123 is elastically connected to the outer frame 124. The rotating shaft 125 is set on the inner frame 123 and passes out the inner frame 123. The lamp 121 is set on the inner frame 123. The position adjusting unit 122 is set on the outer frame 124. The position adjusting unit 122 is used to drive the lamp 121 to move.

The photosensitive unit 13 is used to detect brightness value surrounding the target object. In at least one exemplary embodiment, the photosensitive unit 13 can be a photosensitive sensor, for example, the photosensitive unit 13 can be a CCD sensor. The storage unit 14 stores data of the electronic device 1. In at least one exemplary embodiment, the storage unit 14 stores a system 2 for controlling the flash lamp 12 as a program. In at least one embodiment, the storage unit 14 can include various types of non-transitory computer-readable storage mediums. For example, the storage unit 14 can be an internal storage system, such as a flash memory, a random access memory (RAM) for temporary storage of information, and/or a read-only memory (ROM) for permanent storage of information. In another embodiment, the storage unit 14 can also be an external storage system, such as a hard disk, a storage card, or a data storage medium. The processing unit 15 is used to execute software program code or operational data stored in the storage unit 14. In at least one exemplary embodiment, the processing unit 15 can be a central processing unit (CPU), a microprocessor, or other data processor chip. For example, the processing unit 15 is able to execute the system 2 for controlling the flash lamp 12. The system 2 is used to acquire brightness value around the target object from a photosensitive unit 13 when the camera 11 shoots an image of the target object, and compare the acquired brightness value with a preset value. When the acquired brightness value is less than the preset value, the system 2 turns on the lamp 121 to provide additional light for the target object, and controls the camera 11 to detect whether the target object is moving. When the target object is moving, the system 2 controls the lamp 121 to move to track the target object.

In at least one exemplary embodiment, the inner frame 123 and the outer frame 124 are spherical structures. The inner frame 123 and the outer frame 124 are made of metal. In at least one exemplary embodiment, the inner frame 123 and the outer frame 124 are connected together with each other through a spring (not shown). In at least one exemplary embodiment, the electronic device 1 has two lamps 121. The two lamps 121 are connected to the inner frame 123 and the two lamps 121 are near the spherical center of the inner frame 123. The rotating shaft 125 passes through the spherical center of the inner frame 123 and moves the inner frame 123 against the tension of the spring. In at least one embodiment, the flash lamp 12 further includes a motor 126, a plane mirror 127, a convex lens 128, and two reflecting lampshades 129. The plane mirror 127 and the convex lens 128 are connected to the inner frame 123. In at least one exemplary embodiment, the plane mirror 127 and the convex lens 128 are symmetrically arranged on the inner frame 123 relative to the rotating shaft 125. One of the two reflecting lampshades 129 is connected to the plane mirror 127, the other of the two reflecting lampshades 129 is connected to the convex lens 128. The motor 126 is connected to the inner frame 123. The motor 126 rotates the inner frame 123 around the rotating shaft 125.

Figure 3:
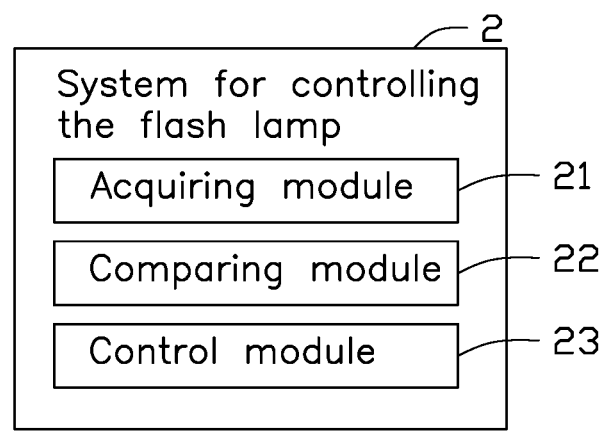
FIG. 3 is a block diagram of an embodiment of a system for controlling the flash lamp of FIG. 1.

FIG. 3 illustrates system 2 for controlling the flash lamp. The system 2 includes, but is not limited to, an acquiring module 21, a comparing module 22, and a control module 23. The modules 21-23 of the system 2 can be collections of software instructions stored in the storage unit 14 and executed by the processing unit 15.

The acquiring module 21 is used to acquire from a photosensitive unit 13 a first brightness value surrounding the target object.

The comparing module 22 is used to compare the acquired first brightness value with the preset value.

The control module 23 turns on the lamp 121 to provide supplemental light for the target object when the first brightness value is less than the preset value. When the camera 11 shoots an image of the target object, the control module 23 controls the camera 11 to detect whether the target object is moving, and control the lamp 121 to move through the position adjusting unit 122 to track and maintain illumination of the target object when the target object is moving.

In at least one exemplary embodiment, the position adjusting unit 122 can be a coil. The position adjusting unit 122 is arranged on the outer frame 124 near the rotating shaft 125. The rotating shaft 125 includes a magnetic element such as a magnet. When the camera 11 focuses on the target object to shoot the image, the control module 23 controls the camera 11 to detect whether the target object is moving. When detecting that the target object is moving, the control module 23 further controls the position adjusting unit 122 to generate a magnetic field. The generated magnetic field can drive the rotating shaft 125 and thus the inner frame 123 to move toward or away from the outer frame 124. The lamp 121 connected to the inner frame 123 is thus driven to move toward or away from the outer frame 124 along the rotating shaft 125 under the driving of the magnetic field. Therefore, the lamp 121 can be adjusted to track the target object under the driving of the magnetic field.

In another embodiment, the position adjusting unit 122 can be a motor. The motor meshes to the inner frame 123 and the outer frame 124. When the camera 11 focuses before shooting the image of the target object and the target object is moving, the control module 23 controls the motor to rotate to make the inner frame move toward or away from the outer frame.

In at least one exemplary embodiment, the control module 23 further changes a light supplementing mode of the lamp 121 between a near light mode and a far light mode. Light emitted by the lamp 121 diverges after the light passes through the plane mirror 127. The near light mode is the mode in which the target object is illuminated by the divergent light. Light emitted by the lamp 121 is aggregated after the light passes through the convex lens 128 and the far light mode is the mode in which the target object is illuminated by the aggregated light.

Figure 4:
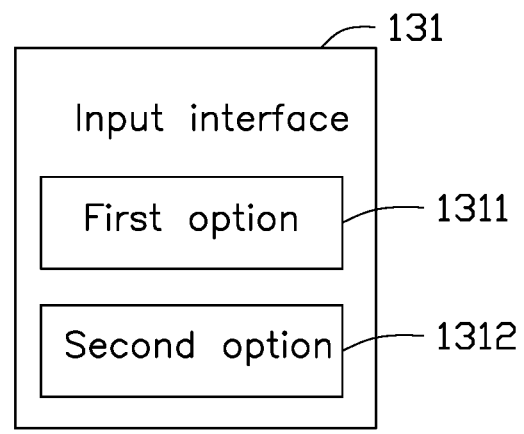
FIG. 4 is a schematic diagram of an input interface of the system of FIG. 3.

In at least one exemplary embodiment, the control module 23 receives an operation input by user, and switches the light supplementing mode according to the operation. In at least one exemplary embodiment, the control module 23 generates an input interface 131. FIG. 4 illustrates the input interface 131. The input interface 131 displays a first option 1311 and a second option 1312. When the user chooses the first option 1311 of the input interface 1311, the control module 23 controls the motor 126 to rotate the plane mirror 127 to make the plane mirror 127 face the target object and turn on the lamp 121 to make the light emitted by the lamp 121 pass through the plane mirror 127 to provide supplemental light for the target object (the near light mode). When the user chooses the second option 1312 of the input interface 1311, the control module 23 controls the motor 126 to rotate the convex lens 128 to make the convex lens 128 face the target object and turn on the lamp 121 to make the light emitted by the lamp 121 pass through the convex lens 128 to provide supplemental light for the target object (the far light mode).

In at least one exemplary embodiment, when the lamp 121 is in the near light mode, the acquiring module 21 further acquires a second brightness value surrounding the target object when the lamp 121 is illuminating the target object. The comparing module 22 further compares the second brightness value with the preset value. When the second brightness value is less than the preset value, the control module 23 changes the light supplementing mode of the lamp 121 to the far light mode from the near light mode. In at least one embodiment, the acquiring module 21 acquires the first brightness value surrounding the target object, and the comparing module 22 compares the first brightness value with the preset value. When the first brightness value is less than the preset value, the control module 23 changes the light supplementing mode of the lamp 121 to the near light mode. Namely, the control module 23 controls the motor 126 to rotate to make the plane mirror 127 face the target object and turns on the lamp 121 to make the light emitted by the lamp 121 pass through the plane mirror 127 to provide supplemental light for the target object. When the lamp 121 is in the near light mode, the acquiring module 21 further acquires the second brightness value surrounding the target object, and the comparing module 22 compares the second brightness value with the preset value. When the second brightness value is less than the preset value, the control module 23 changes the light supplementing mode of the lamp 121 to the far light mode from the near light mode. Namely, the control module 23 controls the motor 126 to rotate to make the convex lens 128 face the target object and turns on the lamp 121 to make the light emitted by the lamp 121 pass through the convex lens 128 to provide supplemental light for the target object.

In at least one exemplary embodiment, the acquiring module 21 further acquires a image of the target object from the camera 11. The control module 23 analyzes a reflected brightness value of the target object in the image and compares the reflected brightness value with a preset value. When the reflected brightness value is greater than the preset value, the control module 23 turns off the lamp 121. In at least one embodiment, when the camera 11 shoots the image of the target object, the acquiring module 21 acquires the image of the target object, and the control module 23 analyzes the reflected brightness value of the target object in the image. The reflected brightness value is compared with the preset value. If the reflected brightness value is greater than the preset value, the control module 23 turns off the lamp 121 when the camera 11 shoots subsequent images of the target object.

Figure 5:
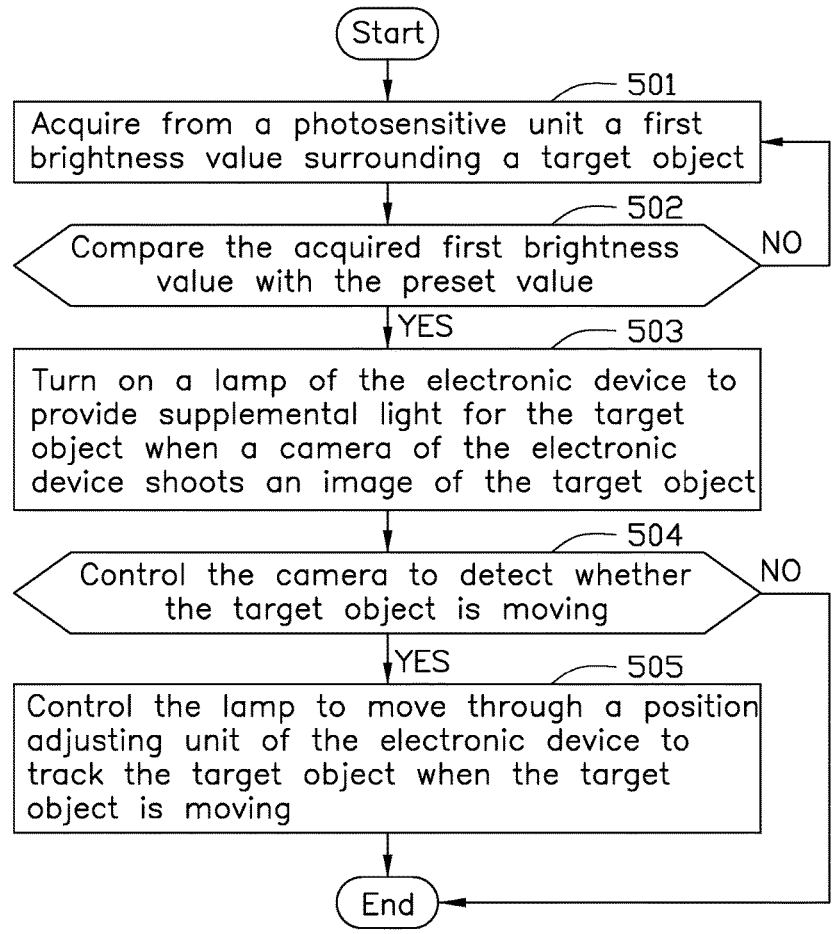
FIG. 5 is a block diagram of an embodiment of a method for controlling the flash lamp of FIG. 3.

FIG. 5 illustrates a flowchart of method for controlling flash lamp. The method is provided by way of example, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 501.

At block 501, an electronic device acquires from a photosensitive unit a first brightness value surrounding a target object.

At block 502, the electronic device compares the acquired first brightness value with the preset value. Wherein, if the acquired first brightness value is less than the preset value, then the method executes block 503, otherwise the method executes block 501.

At block 503, the electronic device turns on a lamp of the electronic device to provide supplemental light for the target object when a camera of the electronic device shoots an image of the target object.

At block 504, the electronic device controls the camera to detect whether the target object is moving. If the target is moving, the method executes block 505, otherwise, the method ends.

At block 505, the electronic device controls the lamp to move through a position adjusting unit of the electronic device to track the target object when the target object is moving.

In at least one exemplary embodiment, the position adjusting unit can be a coil. The position adjusting unit is arranged on an outer frame of an flash lamp. The rotating shaft passes through the spherical center of an inner frame of the flash lamp. The inner frame is elastically connected to the outer frame. The lamp is connected to the inner frame. The rotating shaft includes a magnetic element such as a magnet. When the camera focuses on the target object to shoot the image, the electronic device controls the camera to detect whether the target object is moving. When detecting that the target object is moving, the electronic device further controls the position adjusting unit to generate a magnetic field. The generated magnetic field can drive the rotating shaft and the inner frame to move toward or away from the outer frame. The lamp connected to the inner frame is thus driven to move toward or away from the outer frame along the rotating shaft under the driving of the magnetic field. Therefore, the lamp is adjusted to track the target object under the driving of the magnetic field.

In another embodiment, the position adjusting unit can be a motor. The motor meshes to the inner frame and the outer frame. When the camera focuses before shooting the image of the target object and the target object is moving, the electronic device controls the motor to rotate to make the inner frame move toward or away from the outer frame.

In at least one exemplary embodiment, the method further includes: the electronic device changes a light supplementing mode of the lamp between a near light mode and a far light mode. Wherein, the light emitted by the lamp diverges after the light passes through a plane mirror of the flash lamp, and the near light mode is the mode in which the target object is illuminated by the divergent light. The light emitted by the lamp is aggregated after the light passes through a convex lens of the flash lamp, and the far light mode is the mode in which the target object is illuminated by the aggregated light.

In at least one exemplary embodiment, the electronic device receives a switching operation input by user, and switches the light supplementing mode according to the switching operation. In at least one exemplary embodiment, the electronic device generates an input interface. The input interface displays a first option and a second option (referring to FIG. 4). When the user chooses the first option, the electronic device controls a motor of the flash lamp to rotate the plane mirror to make the plane mirror face the target object and turn on the lamp to make the light emitted by the lamp passes through the plane mirror to provide supplemental light for the target object (the near light mode). When the user chooses the second option, the electronic device controls the motor to rotate the convex lens to make the convex lens face the target object and turn on the lamp to make the light emitted by the lamp passes through the convex lens to provide supplemental light the target object. Namely, when the user chooses the second option, the electronic device changes the light supplementing mode of the lamp to the far light mode (the far light mode).

In at least one exemplary embodiment, the method further includes: the electronic device acquires a second brightness value surrounding the target object when the lamp is in the near light mode, compares the second brightness value with the preset value, changes the light supplementing mode of the lamp to the far light mode from the near light mode when the second brightness value is less than the preset value.

In at least one embodiment, when the camera shoots image of the target object, the electronic device acquires the first brightness value surrounding the target object, and compares the first brightness value with the preset value. When the first brightness value is less than the target object, the electronic device changes the light supplementing mode of the lamp to the near light mode. In at least one exemplary embodiment, the electronic device controls the motor to rotate to make the plane mirror face the target object and turn on the lamp to make the light emitted by the lamp passes through the plane mirror to provide supplemental light for the target object. When the lamp is in the near light mode, the electronic device further acquires the second brightness value surrounding the target object, and compares the second brightness value with the preset value. When the second brightness value is less than the preset value, the electronic device changes the light supplementing mode of the lamp to the far light mode from the near light mode. In at least one exemplary embodiment, the electronic device controls the motor to rotate to make the convex lens face the target object and turn on the lamp to make the light emitted by the lamp passes through the convex lens to provide supplemental light for the target object.

In at least one exemplary embodiment, the method further includes: the electronic device acquires an image of the target object from the camera, analyzes a reflected brightness value of the target object in the image, compares the analyzed reflecting brightness value with a preset value, turns off the lamp when the reflected brightness value is greater than the preset value.

In at least one exemplary embodiment, when the camera shoots the image of the target object, the electronic device acquires the image of the target object, analyzes the reflected brightness value of the target object in the image, and compares the reflected brightness value with the preset value. If the reflected brightness value is greater than the preset value, the electronic device turns off the lamp when the camera shoots a subsequent images of the target object.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A flash lamp comprising:
an inner frame;
an outer frame elastically connected to the inner frame;
a lamp connected to the inner frame, the lamp providing supplemental light for a target object when a camera shoots image of the target object;
a rotating shaft set on the inner frame and passing through the inner frame; and
a position adjusting unit connected to the inner frame, the position adjusting unit driving the inner frame to rotate the inner frame along the rotating shaft to move the lamp.

2. The flash lamp according to claim 1, wherein the inner frame and the outer frame are spherical structure.

3. The flash lamp according to claim 1, wherein the rotating shaft passes through spherical center of the inner frame and stretches out the inner frame.

4. The flash lamp according to claim 3, wherein the rotating shaft defines a magnet.

5. The flash lamp according to claim 1, wherein the flash lamp further comprises a motor, a plane mirror, a convex lens and two reflecting lampshades, the plane mirror and the convex lens are connected to the inner frame, one of the two reflecting lampshades is connected to the plane mirror, the other of the two reflecting lampshades is connected to the convex lens, the motor is connected to the inner frame, the motor is configured to drive to rotate the inner frame surrounding the rotating shaft.

6. The flash lamp according to claim 1, wherein the position adjusting unit can be a coil.

7. The flash lamp according to claim 1, wherein the position adjusting unit can be a motor.

8. An electronic device having a flash lamp according to claim 1, the electronic device comprising:
a camera configured to shoot an image of a target object;
a photosensitive unit configured to detect brightness value surrounding the target object;
a processing unit coupled to the camera and the photosensitive unit;
a non-transitory storage medium coupled to the processing unit and configured to store a plurality of instructions, which causes the electronic device to:
acquire a first brightness value surrounding the target object from the photosensitive unit;
compare the acquired first brightness value with a preset value;
turn on the lamp to provide supplemental light for the target object when the first brightness value is less than the preset value and when the camera shoots an image of the target object;
control the camera to detect whether the target object is moving; and
control the lamp to move through the position adjusting unit to track the target object when the target object is moving.

9. The electronic device according to claim 8, wherein the position adjusting unit can be a coil, the plurality of instructions is further configured to cause the electronic device to control the coil to generate a magnetic field when detecting the target object is moving, wherein the generated magnetic field drives the rotating shaft and the inner frame to move toward or away from the outer frame, the lamp connected to the inner frame is driven to move toward or away from the outer frame under the driving of the magnetic field to track the target object.

10. The electronic device according to claim 8, wherein the plurality of instructions is further configured to cause the electronic device to change a light supplementing mode of the lamp between a near light mode and a far light mode, wherein light emitted by the lamp is diverged after the light passes through a plane mirror, the near light mode is the mode in which the target object is illuminated by the divergent light, the light emitted by the lamp is aggregated after the light passes through a convex lens, the far light mode is the mode in which the target object is illuminated by the aggregated light.

11. The electronic device according to claim 10, wherein the plurality of instructions is further configured to cause the electronic device to receive an operation input by an input interface, and switch the light supplementing mode according to the operation.

12. The electronic device according to claim 10, wherein the plurality of instructions is further configured to cause the electronic device to acquire a second brightness value surrounding the target object when the lamp is in the near light mode, compare the second brightness value with the preset value, change the light supplementing mode of the lamp to the far light mode when the second brightness value is less than the preset value.

13. The electronic device according to claim 8, wherein the plurality of instructions is further configured to cause the electronic device to acquire an image of the target object from the camera, analyze a reflected brightness value of the target object in the target image, compare the reflected brightness value with the preset value, and turn off the lamp when the reflecting brightness value is greater than the preset value.

14. A method for controlling a flash lamp according to claim 1, the method comprising:
acquire a first brightness value surrounding a target object from a photosensitive unit;
compare the acquired first brightness value with a preset value;

turn on the lamp to supplement light for the target object when the first brightness value is less than the preset value and when a camera shoots an image of the target object;

control the camera to detect whether the target object is moving; and control the lamp to move through a position adjusting unit to track the target object when the target object is moving.

15. The method according to claim 14, wherein the position adjusting unit can be a coil, the method further comprises:

control the position adjusting unit to generate a magnetic field when detecting the target object is moving, wherein the generated magnetic field drives a rotating shaft and an inner frame to move toward or away from an outer frame, the lamp connected to the inner frame is driven to move toward or away from the outer frame under the driving of the magnetic field to track the target object.

16. The method according to claim 14, further comprising:

change a light supplementing mode of the lamp between a near light mode and a far light mode, wherein light emitted by the lamp is divergent light after the light passes through a plane mirror, the near light mode is the mode in which the divergent light supplements the target object, the light emitted by the lamp is aggregation light after the light passes through a convex lens, the far light mode is the mode in which the aggregation light supplements the target object.

17. The method according to claim 16, further comprising:

receive an operation input by an input interface, and switch the light supplementing mode according to the operation.

18. The method according to claim 16, further comprising:

acquire a second brightness value surrounding the target object when the lamp is in the near light mode;

compare the second brightness value with the preset value;

change the light supplementing mode of the lamp to the far light mode when the second brightness value is less than the preset value.

19. The method according to claim 14, further comprising:

acquire an image of the target object from the camera;

analyze a reflected brightness value of the target object in the image;

compare the reflected brightness value with the preset value; and turn off the lamp when the reflected brightness value is greater than the preset value.

* * * * *